(12) United States Patent
Kito

(10) Patent No.: US 6,237,850 B1
(45) Date of Patent: May 29, 2001

(54) BAR CODE READER AND METHOD OF READING BAR CODE

(75) Inventor: Masaru Kito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/387,298

(22) Filed: Feb. 10, 1995

(30) Foreign Application Priority Data

Mar. 18, 1994 (JP) .................................................. 6-049600

(51) Int. Cl.⁷ ...................................................... G06K 7/10
(52) U.S. Cl. .............................. 235/462.08; 235/462.25; 235/462.37
(58) Field of Search ............................. 235/462, 462.25, 235/462.37, 462.08

(56) References Cited

U.S. PATENT DOCUMENTS

| | | | | |
|---|---|---|---|---|
| 4,933,538 | * | 6/1990 | Heiman et al. | 235/462 |
| 5,115,121 | * | 5/1992 | Bianco et al. | 235/466 X |
| 5,235,167 | * | 8/1993 | Dvorkis et al. | 235/462 |
| 5,258,699 | * | 11/1993 | Grodevant | 235/470 X |
| 5,386,107 | * | 1/1995 | Dvorkis et al. | 235/462 X |
| 5,552,590 | * | 9/1996 | Obata et al. | 235/455 |

FOREIGN PATENT DOCUMENTS

00517958 * 12/1992 (EP) ..................................... 235/470

OTHER PUBLICATIONS

Palmer, Roger C., The Bar Code Book, Helmers Publishing, Inc., pp. 28–35, 69–75, 1991.*

* cited by examiner

Primary Examiner—Mark Tremblay
(74) Attorney, Agent, or Firm—Armstrong, Westerman, Hattori, McLeland, & Naughton, LLP

(57) ABSTRACT

A bar code reader including a transmitter made up of a light source, a vibrating mirror which scans bar codes using a light beam from the light source and collects light reflected by the bar codes, a receiver made up of a light sensor which converts the reflected light that is collected into electrical signals, and a decoder which converts the coded data into data characters, wherein provision is made of a vibration angle adjuster, and the angle of vibration of the vibrating mirror is changed in order to increase or decrease the scanning region of the laser beam for the bar codes.

7 Claims, 11 Drawing Sheets

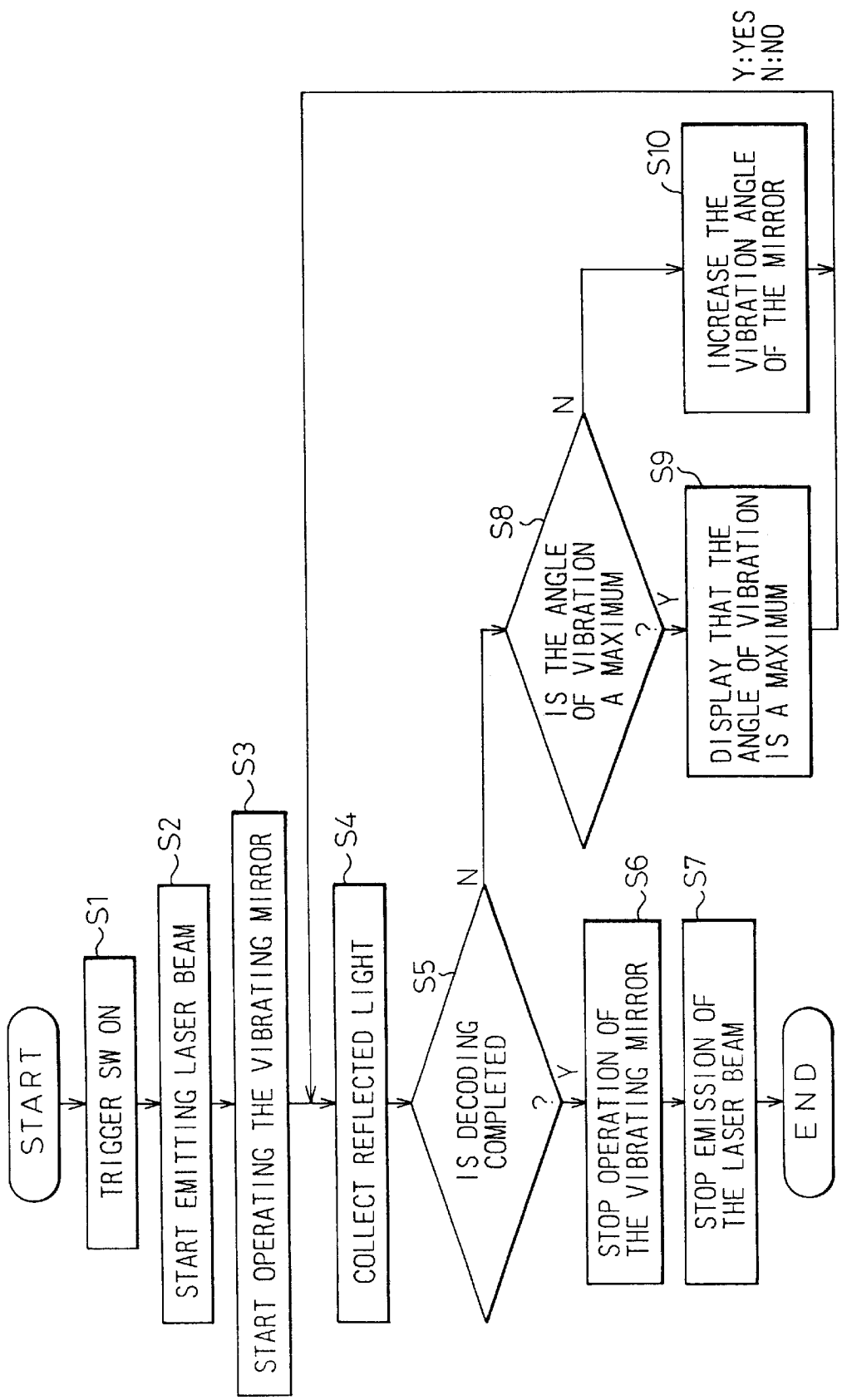

BAR CODE READER AND METHOD OF READING BAR CODE

BACKGROUND OF THE INVENTION

(1) Field of the Invention

The present invention relates to a bar code reader and to a method of reading a bar code. More specifically, the invention relates to a bar code reader which is capable of scanning and reading a bar code by employing, for example, a handheld laser scanner or the like, and to a method of reading a bar code.

(2) Description of the Related Art

A portable terminal device called a handheld terminal has been developed in the physical distribution-related services such as stock management (ordering of goods, stocktaking), etc., for the purpose of grasping and collecting data at a moment when the data are produced. The data collected by the handheld terminal are sent to a host computer (personal computer, office computer, etc.) installed in an office where they are analyzed and processed to be used as determined by the management (policy of business, service for customers, management of goods, etc.).

Furthermore, a bar code reader has been widely utilized as a means for inputting data to the handheld terminal. Inputting the data relying upon bar codes has been extensively employed since it is quicker and easier than inputting the data by hand through a keyboard and is more accurate.

The bar code reader will usually be a touch scanner or a pen scanner using a light-emitting diode, but a handheld laser scanner has been widely used. This device contains a transmitter, a vibrating mirror (the angle of vibration of the vibrating mirror being constant), a receiver, a decoder, an interface and the like. Therefore, it becomes difficult to correctly read the data when a plurality of bar codes are included in a scanning range of the scanning beam. This conventional bar code reader will be described later in the description of the preferred embodiments with reference to the drawings.

SUMMARY OF THE INVENTION

In order to eliminate the above-mentioned inconvenience inherent in the conventional device, the object of the present invention is to provide a bar code reader which need not be brought close to a bar code or which does not require bar codes other than the desired bar code to be concealed even when a plurality of bar codes are included in the scanning region of the beam projected from the bar code reader.

According to a first aspect of the present invention, there is provided a bar code reader comprising a transmitter made up of a light source, a vibrating mirror which scans bar codes using a light beam from the transmitter and collects light reflected by the bar codes, a receiver made up of a light sensor which converts the reflected light that is collected into electrical signals, a decoder which converts the electrical signals from the receiver into data characters, and a vibration angle adjuster means for scanning the bar codes while changing the angle of vibration of the vibrating mirror.

According to a second aspect of the present invention, there is provided a method of reading a bar code comprising a first step for emitting a light beam from a light beam-emitting element, a second step for operating a vibrating mirror which scans the bar codes using the light beam and collects the light reflected by the bar codes, the vibrating mirror being allowed to change its angle of vibration, a third step for converting the light that is reflected by the bar codes and is collected into electrical signals, and a fourth step for decoding the electrical signals into data characters.

Other features and advantages of the invention will become apparent from the following description with reference to the accompanying drawings.

BRIEF DESCRIPTION OF THE DRAWINGS

FIG. 12 is a flow chart illustrating the basic operation of the bar code reader according to a first embodiment of the present invention;

DESCRIPTION OF THE PREFERRED EMBODIMENTS

Prior to describing the preferred embodiments of the present invention, a conventional art will be described below with reference to the drawings.

Figure 1:
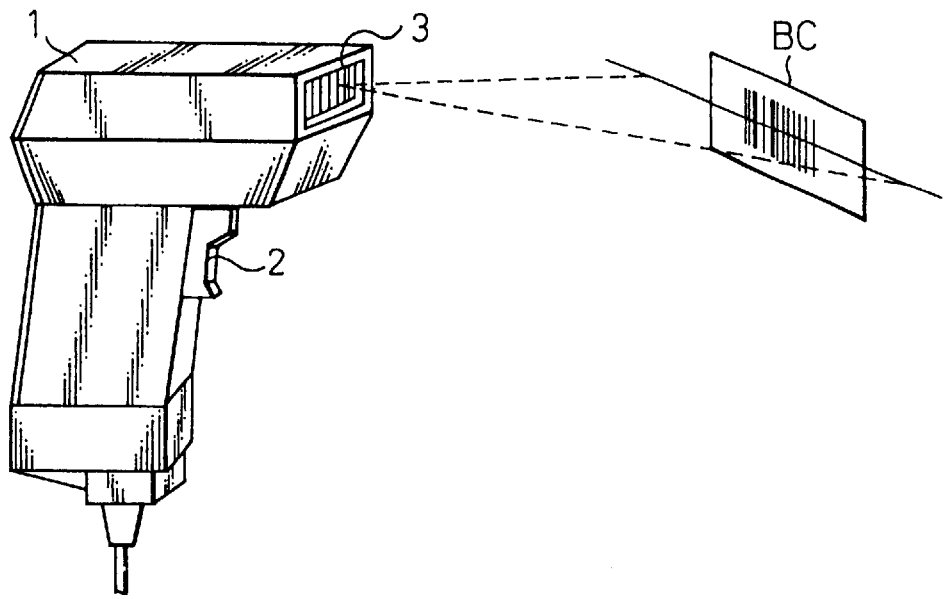
FIG. 1 is a perspective view of a handheld bar code reader.

First, FIG. 1 illustrates a bar code reader 1 that is called a handheld laser scanner. When a trigger switch 2 is manipulated with the device being directed to the bar code BC, a scanning beam is emitted from an exit window 3 as indicated by broken lines to scan the bar code BC and to read it.

Figure 2:
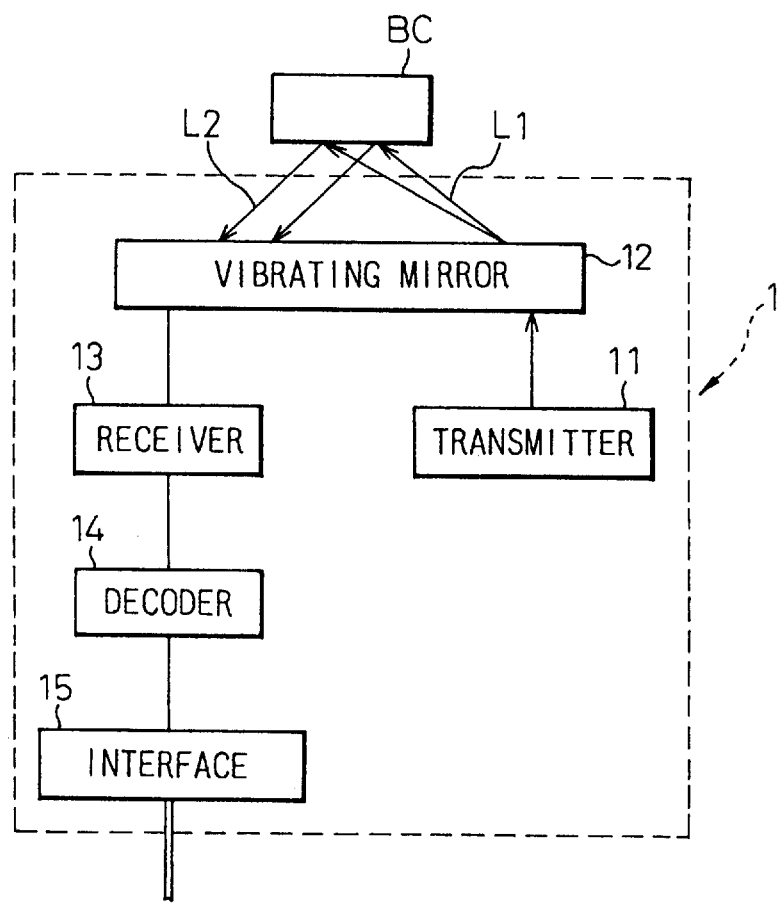
FIG. 2 is a block diagram illustrating the constitution of a conventional bar code reader.

FIG. 2 is a block diagram illustrating the overall constitution of the bar code reader 1 which contains a transmitter 11, a vibrating mirror 12, a receiver 13, a decoder 14 and an interface 15.

The transmitter 11 uses, for example, a semiconductor laser as a source of light. A laser beam that is generated is vibrated by the vibrating mirror 12 by a predetermined angle of vibration and arrives at the bar code in the form of a scattered scanning beam L1.

A laser beam L2 reflected by the bar code BC is collected again by the vibrating mirror 12 and is converted into an electrical signal by the receiver 13.

Here, the electric signal which contains bar code data that has been coded and converted into a numerical data or the like data by the decoder 14, and is transmitted to a host device such as a handheld terminal via the interface 15.

Figure 3:
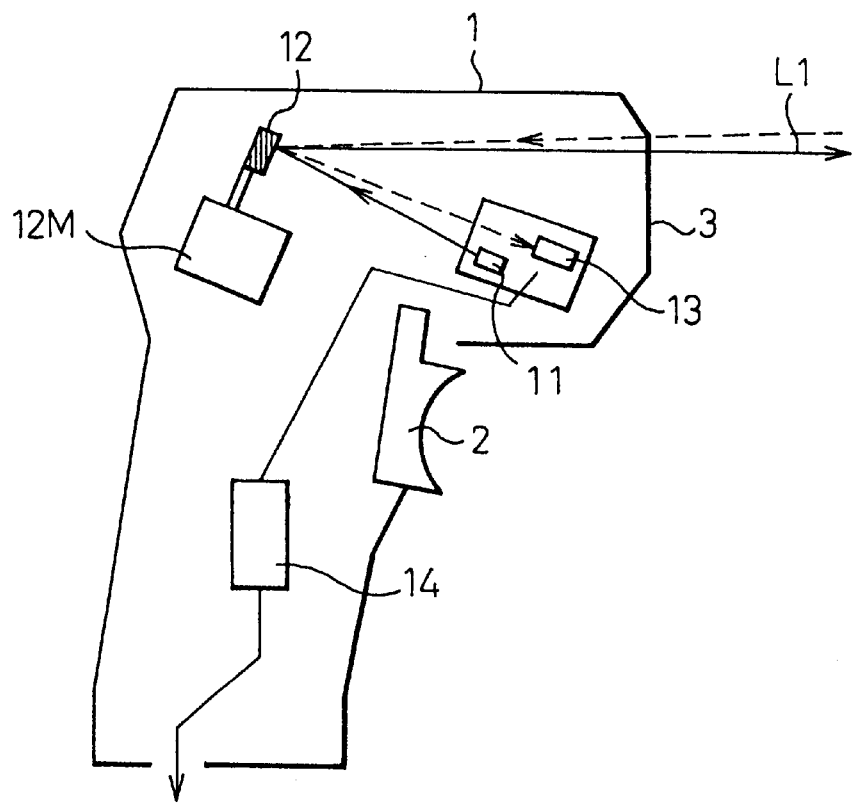
FIG. 3 is a diagram explaining principal constitution of a handheld bar code reader.

FIG. 3 illustrates the principal constitution inside the handheld laser scanner. When the trigger switch 2 is depressed, the semiconductor source of laser beam 11 in the device generates the laser beam L1.

The laser beam is then reflected and vibrated by the vibrating mirror 12 that is vibrated by a motor 12M maintaining a predetermined angle of vibration, and is projected through an exit window 3 onto a bar code that is not shown as a scanning beam L1 having the locus of a segment.

The projected scanning beam L1 is reflected by the bar code, collected by the vibrating mirror 12 in the device passing again through the exit window 3, and is converted by the receiver element 13 into an electric signal corresponding to the amount of the reflected light.

The electrical signal is converted into a numerical data or the like data through the decoder 14 and is sent to the host device such as the handheld terminal.

Here, no interference takes place between the projected beam and the reflected beam owing to the characteristics of the laser beam.

Figure 4:
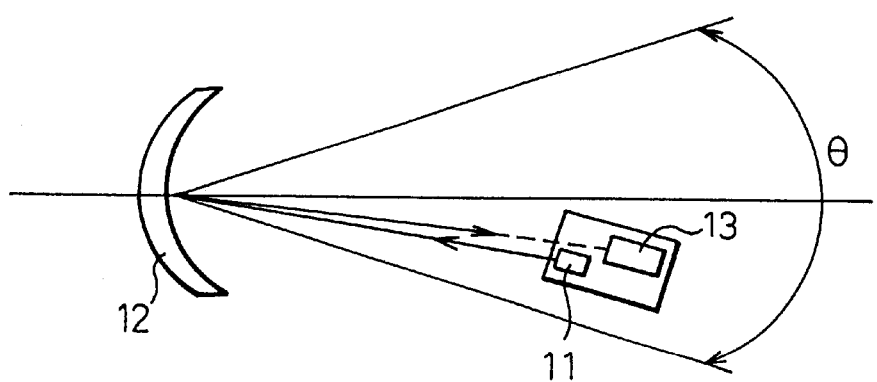
FIG. 4 is a diagram illustrating the angle of vibration of the bar code reader.

In the bar code reader which is the conventional handheld laser scanner as shown in FIG. 4, the angle of vibration θ of the vibrating mirror 12 is constant.

Therefore, the scanning region of the scanning beam L1 projected onto the bar code varies in proportion to the distance between the vibrating mirror 12 and the bar code.

Figure 5:
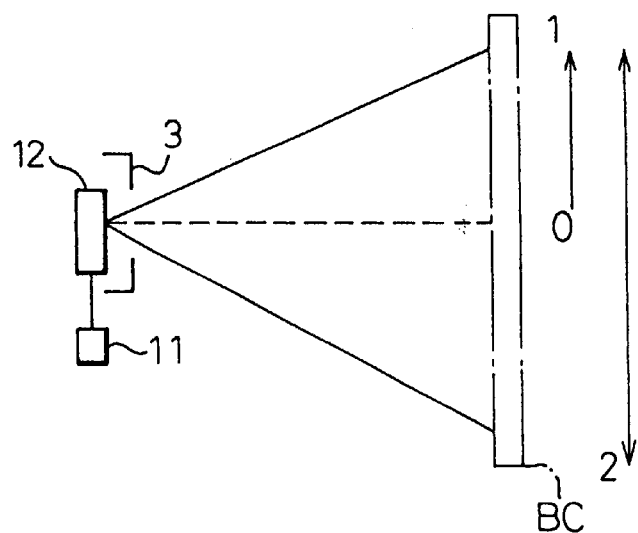
FIG. 5 is a diagram illustrating a state of the scanning beam of the conventional bar code reader according to a prior art.

FIG. 5 shows a relationship between the angle of vibration of the laser beam and the scanning beam as viewed from the upper side of the handheld laser scanner, wherein reference numeral 12 denotes the vibrating mirror and 3 denotes the exit window. The vibrating mirror 12 is so vibrated that the scanning starts from 0 and, then, travels between 1 and 2. Since the angle of vibration of the vibrating mirror 12 is constant, the length 1–2 of segment of the scanning beam width is constant over the predetermined distance up to the bar code.

Figure 6:
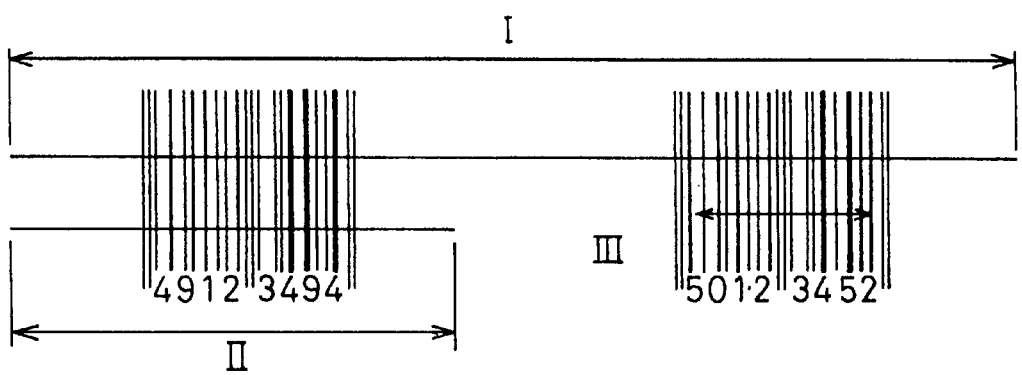
FIG. 6 is a diagram illustrating a relationship between the closely neighboring bar codes and the scanning region of a scanning beam.

Therefore, because a plurality of bar codes are scanned, a normal demodulation of the bar codes is not executed, so that it becomes difficult to correctly read the bar code, when a plurality of bar codes are included in the vibration range I of the scanning beam as shown, for example, on the upper side in FIG. 6.

In such a case, it becomes necessary to bring the exit window 3 of the bar code reader 1 close to the read surface, so that one bar code only is scanned, i.e., so that the vibration range of the scanning beam is reduced to II, or it becomes necessary to conceal the other bar code.

In practice, however, it may happen that the bar code reader cannot be brought close to the bar code since the bar code is located at a high position or obstacle exists in the way to the bar code, or unnecessary bar codes cannot be concealed.

When the bar code reader is brought too close to the bar code, on the other hand, the bar code may be scanned only partly by the laser beam as represented by a scanning range III in FIG. 6. In such a case, the bar code reader must be moved away from the bar code by some distance.

The present invention will now be described with reference to the drawings.

Figure 7:
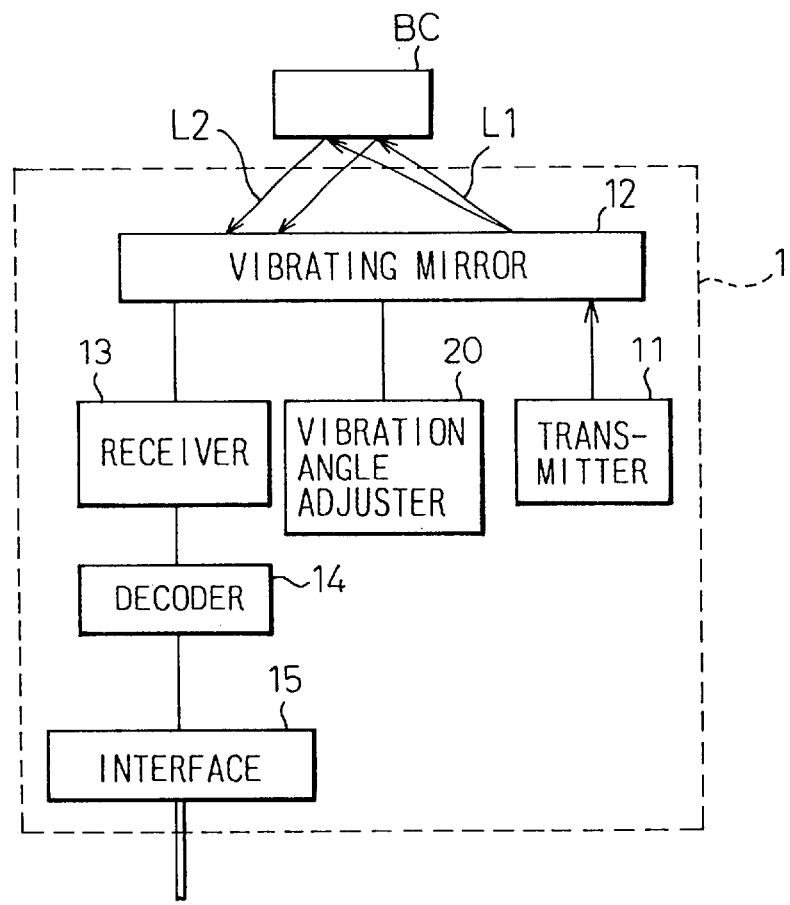
FIG. 7 is a block diagram illustrating the outline of the present invention.

FIG. 7 is a block diagram which illustrates the outline of the present invention, i.e., illustrates the constitution of the bar code reader 1 which is a handheld laser scanner. The same constituent elements as those of the block diagram of FIG. 2 are denoted by the same reference numerals. The transmitter 11 includes a light source and as the light source, a semiconductor laser, a gas laser, a light emitting diode or the like is used.

In this constitution, the vibrating mirror 12 is provided with a vibration angle adjuster 20. Operation of the vibration angle adjuster 20 is as described below with reference to FIGS. 8 to 11.

Figure 8:
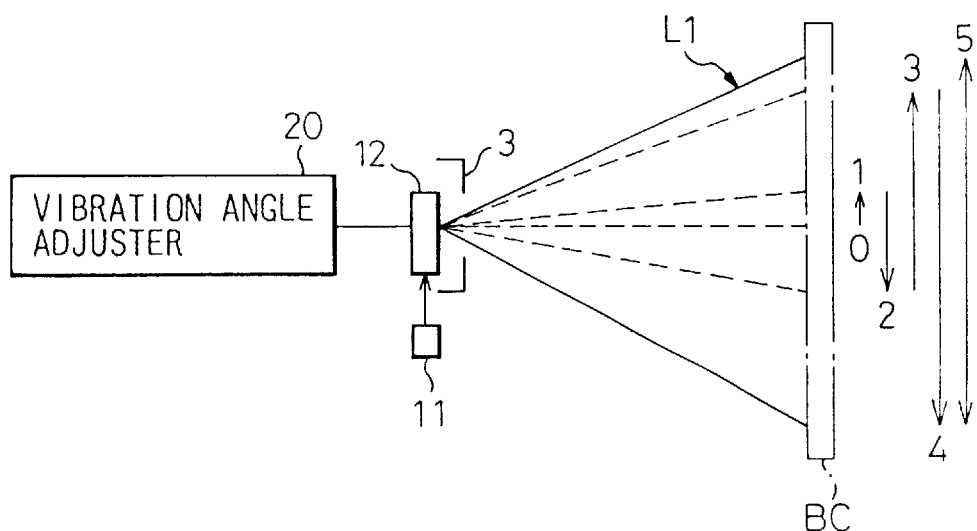
FIG. 8 is a diagram illustrating a first example of the basic operation of the scanning beam in the bar code reader of the present invention.

FIG. 8 illustrates a first example of the operation of the bar code reader of the present invention, and shows a relationship between the angle of vibration of the laser beam L1 and the scanning region as viewed from the upper side of the device 1, wherein reference numeral 12 denotes a vibrating mirror, and 3 denotes an exit window for projecting the laser beam and for permitting the incidence of the reflected beam. The vibrating mirror 12 is provided with the vibration angle adjuster 20.

The angle of vibration of the vibrating mirror 12 is variable and stepwisely increases, e.g., 1, 2, 3, 4, starting from the initial position 0. Therefore, the width of the scanning region of the scanning beam at the position of the bar code increases stepwisely.

Figure 15:
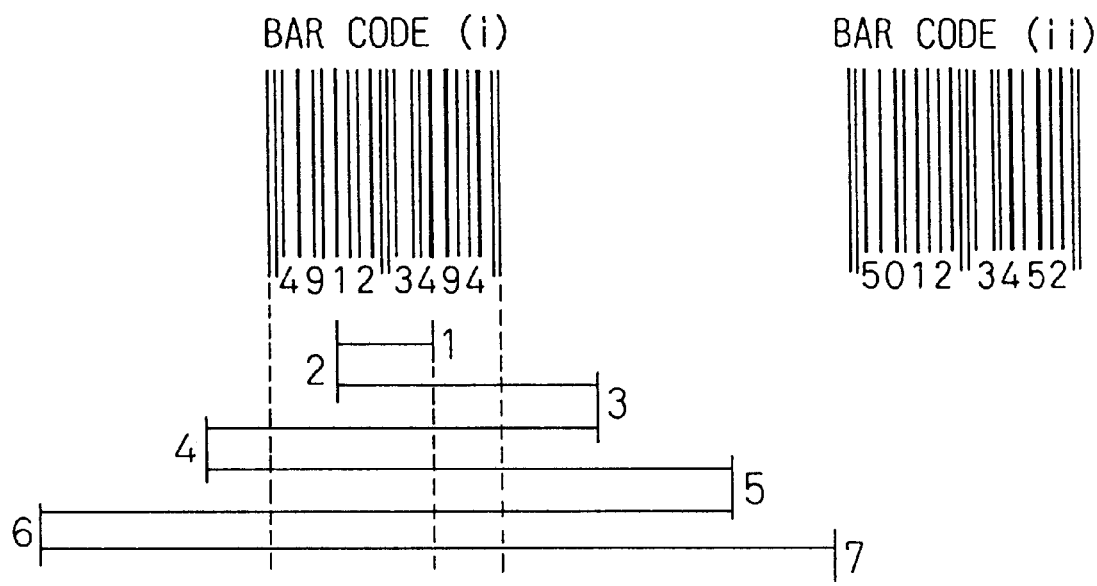
FIGS. 15 is a diagram additionally illustrating the first example of FIG. 8.

Therefore, as shown in FIG. 15, even when there exist a plurality of bar codes (i) and (ii) close to each other, any one of the bar codes can be reliably read out during the initial stage in which the scanning beam covers a narrow scanning region, in the scanning region enlarging steps 1 to 7.

Figure 9:
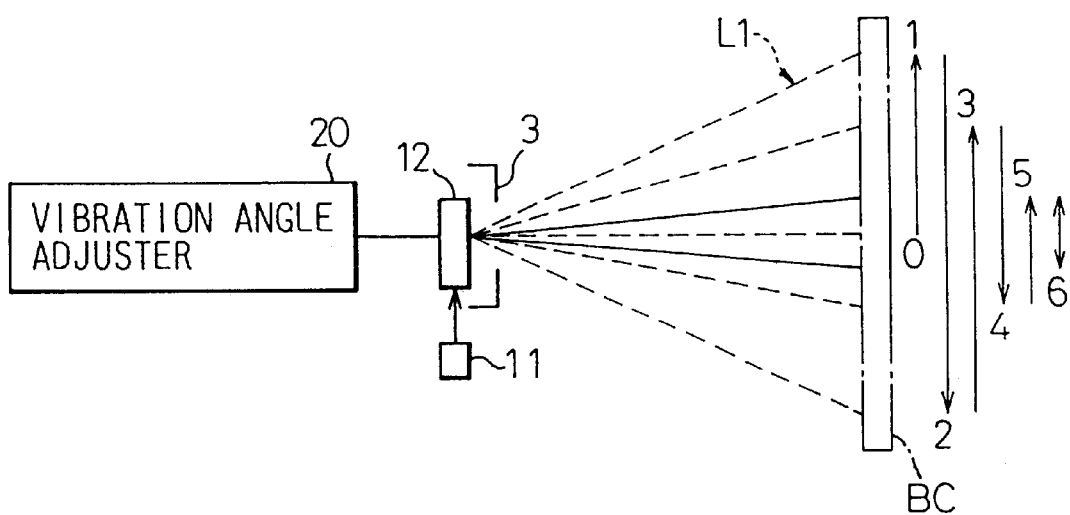
FIG. 9 is a diagram illustrating a second example of the basic operation of the scanning beam in the bar code reader of the present invention.

FIG. 9 illustrates a second example of the operation of the bar code reader according to the present invention.

In this case, the angle of vibration of the vibrating mirror 12 is, first, maintained constant due to the vibration angle adjuster 20 provided for the vibrating mirror 12. The angle of vibration is then narrowed at a predetermined rate when it is confirmed that there is no change in the amount of the reflected light for more than a specified time period which corresponds to the interval between two bar codes. When there is no change in the amount of the reflected light for more than the specified time period, the angle of vibration is further decreased at a predetermined rate.

Therefore, the scanning region of the scanning beam having a predetermined distance becomes gradually narrow. When there exist a plurality of bar codes that are close to each other at a position of the bar code that is to be read, any one of the bar codes can be read at a step where the scanning region becomes narrow.

Figure 10:
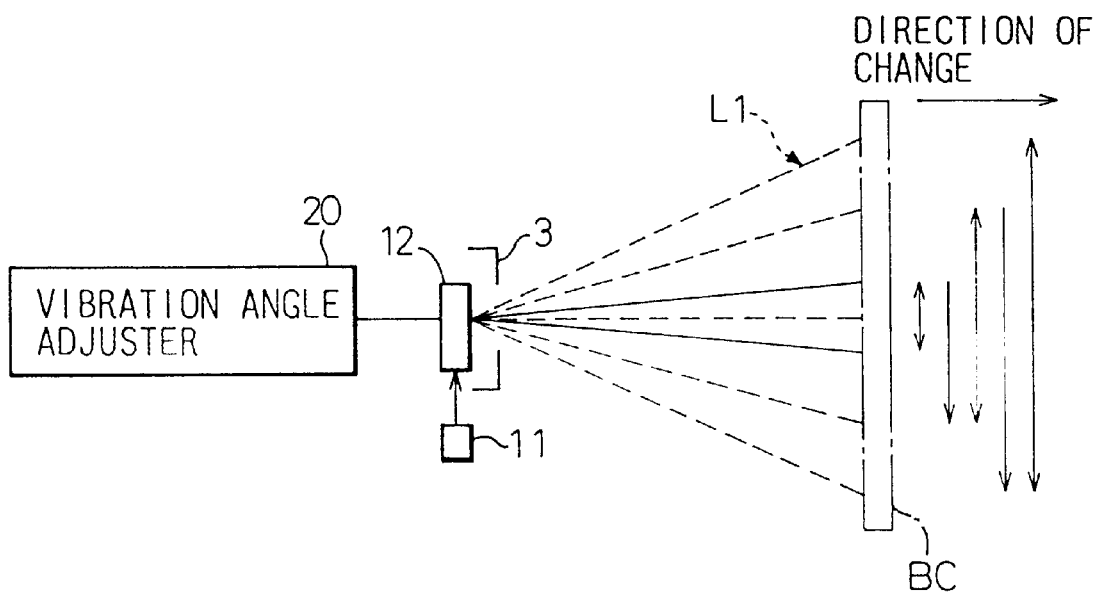
FIG. 10 is a diagram illustrating a third example of the basic operation of the scanning beam in the bar code reader of the present invention.
Figure 11:
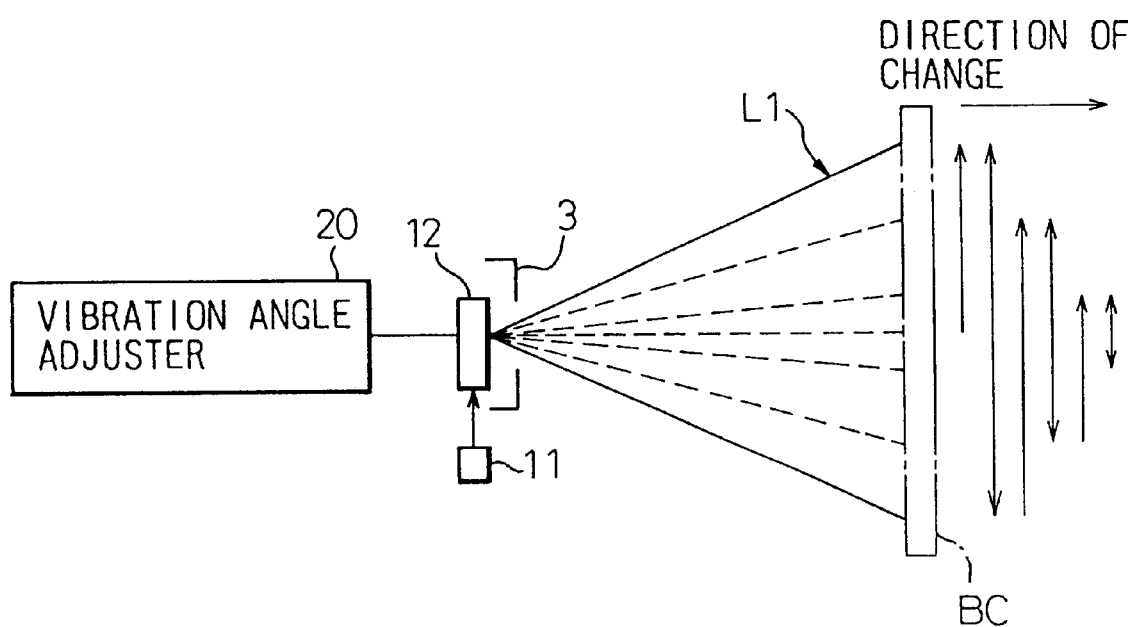
FIG. 11 is a diagram illustrating a fourth example of the basic operation of the scanning beam in the bar code reader of the present invention.

Further, by using scanning examples shown in FIG. 10 or FIG. 11, the same effect is obtained. In the example of FIG. 10, the scanning beam is changed symmetrically to the center line in the right and left directions, first with a small amplitude which gradually increases to a second amplitude and finally arrives at a maximum amplitude. The expansion of the amplitude may be carried out after a certain time or after a certain number of scanning operations, or in accordance with a result of reading bar code data. In the example of FIG. 11, the scanning beam is changed symmetrically to the center line in the right and left directions, first with a large amplitude which gradually decreases to a second amplitude and finally arrives at a minimum amplitude. The reduction of the amplitude may be carried out after a certain time or after a certain number of scanning operations, or in accordance with a result of reading bar code data.

According to the present invention as shown in FIGS. 8 and 9 or FIGS. 10 and 11, the angle of vibration of the vibrating mirror in the bar code reader constituted as a handheld laser scanner is changed in a predetermined way by the operation of the vibration angle adjuster 20, in order to change the scanning region of the scanning beam for reading the bar code.

Even when a plurality of bar codes are included in the scanning region of the scanning beam as shown in FIG. 6, any one of the bar codes can be scanned by the scanning beam, and a problem does not occur that it is not certain which bar code is read or that the bar code is scanned only partly and is not correctly read.

An embodiment of the present invention will now be described with reference to the accompanying drawings. The vibration angle adjuster 20 shown in FIG. 7 suitably changes the angle of vibration of the vibrating mirror 12 to change the scanning region. This can be accomplished by a variety of means, such as mechanically changing the coupling between the vibrating mirror 12 and the motor 12M (see FIG. 3) that drives the vibrating mirror 12. Or, this can be accomplished electrically by controlling the voltage, current or frequency that drives the motor 12M.

FIG. 12 is a flow chart for controlling the operation of the bar code reader according to a first embodiment of the present invention (in the case of increasing the angle of vibration). As the flow is started, an operator depresses the trigger switch 2 (see FIG. 1) to turn it on (step S1) to read the bar code. As a result, a laser beam-emitting element 11 in the transmitter works to emit a laser beam (step S2). Accompanying the emission of the laser beam, the vibrating mirror 12 starts vibrating (step S3) in a manner that the angle of vibration gradually increases as 0–1, 1–2, - - - as shown in FIG. 8 or 10.

The laser beam is reflected and scattered by the vibrating mirror 12 and is projected onto the bar code as a vibrating scanning beam that corresponds to a desired scanning region.

The projected scanning beam is reflected by the bar code, collected again by the vibrating mirror 12, and is converted into an electrical signal that varies in proportion to the amount of the reflected light (step S4).

The electrical signal is converted into numerical data or similar data through the decoder 14, and it is determined whether the decoded result is normal and the decoding is completed, i.e., whether the bar code is normally read out or not (step S5). When the decoding is completed, operation of the vibrating mirror is halted (step S6), the laser beam is no longer emitted (step S7), and the bar code reading is finished.

When the electric signal has not been converted into numerical data and the decoding has not been completed at the step S5 (in the case that the scanner is near to a bar code so that the bar code cannot be scanned completely, or in the case that a plurality of bar codes are scanned simultaneously), it is regarded that the width of the scanning beam was so narrow that the whole bar code could not be covered by the scanning beam. Then, it is determined whether the angle of vibration is maximum or not (step S8).

When the angle of vibration is a maximum and cannot be increased any more, this fact is displayed (step S9). Then, the process for collecting the reflected light (step S4) and the subsequent processes are executed while maintaining the angle of vibration unchanged.

In such a case, it would be convenient if a message could be displayed requesting the user to move the bar code reader away from the bar code and conceal the bar code on either side, if necessary.

When the angle of vibration has not reached a maximum, the process is executed to gradually increase the angle of vibration of the mirror from 1–2 to 2–3, 2–3 to 3–4 as in FIG. 8 (step S10) and, then, the process of collecting the reflected light (step S4) and subsequent processes are executed.

The process for increasing the angle of vibration of the mirror may be effected by determining whether the bar code was normally read out or not after having continued the scanning while maintaining a predetermined angle of vibration a predetermined number of times or for a predetermined period of time. Or, the angle of vibration may be gradually increased after a predetermined number of times or after the passage of a predetermined period of time irrespective of the detection of the bar code. Further, the angle of vibration may be automatically increased after the scanning is executed with a predetermined angle for a predetermined number of times or a predetermined time.

FIGS. 13A, 13B, 14A and 14B illustrate the operation for controlling the bar code reader according to a second embodiment of the present invention.

Figure 13A:
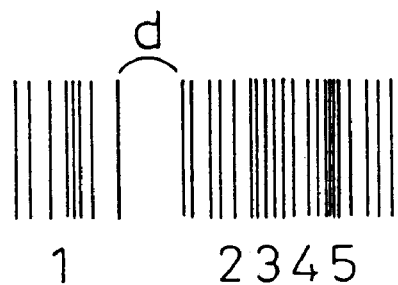
FIG. 13A is a diagram explaining the bar codes that are to be read by the bar code reader of the present invention.
Figure 13B:
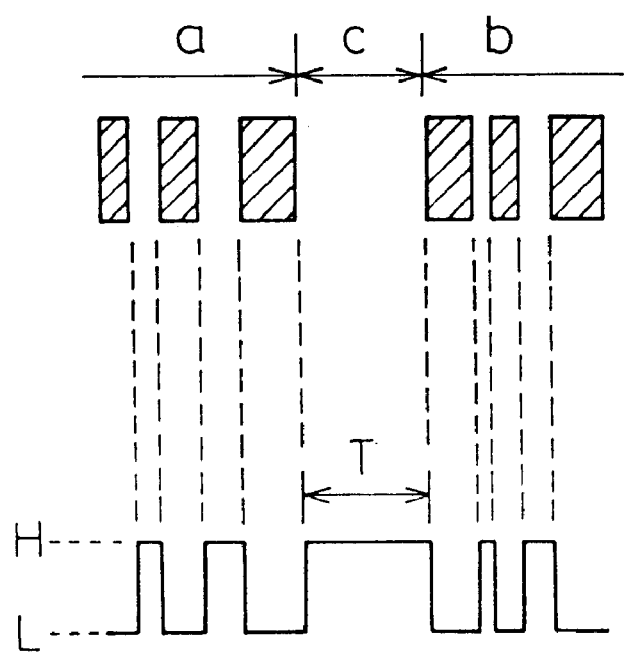
FIG. 13B is a diagram illustrating signal waveforms of when the closely neighboring bar codes are read.

Here, FIGS. 13A and 13B illustrate the state of bar codes which are positioned close to each other. This embodiment is suited for reading such bar codes.

In FIG. 13A, numeral "1" represents part of a first bar code, and numerals "2345" represent part of a second bar code, with a gap d existing between the two bar codes. In this embodiment, when a plurality of closely neighboring bar codes as shown in FIG. 13A are to be read, the scanning region first covers a wide range including these bar codes and is then gradually reduced.

FIG. 13B illustrates on an enlarged scale part of the closely neighboring bar codes, wherein symbol a represents the first bar code "1" in FIG. 13A, b represents the second bar code "2345", and c represents a gap d in FIG. 13A. If the abscissa is regarded to be a time axis, there are obtained pulse-like electrical signals as shown in the lower stage corresponding to the arrangement of bars (hatched portions) of the bar codes and white portions. Here, the logic L corresponds to a bar and the logic H corresponds to a white portion.

Between these two separate bar codes, there is a blank portion T in the logic signal which is much longer than the gaps among the ordinary bars. By detecting the length of this blank portion T, it is discriminated whether the plurality of bar codes are close to one another or not.

In such a case, the angle of vibration of the vibrating mirror 12 is gradually decreased as shown in FIG. 9 or 11, and the scanning of the laser beam is so controlled that no blank portion is detected and that the bar code of one side only is read out.

Figure 14A:
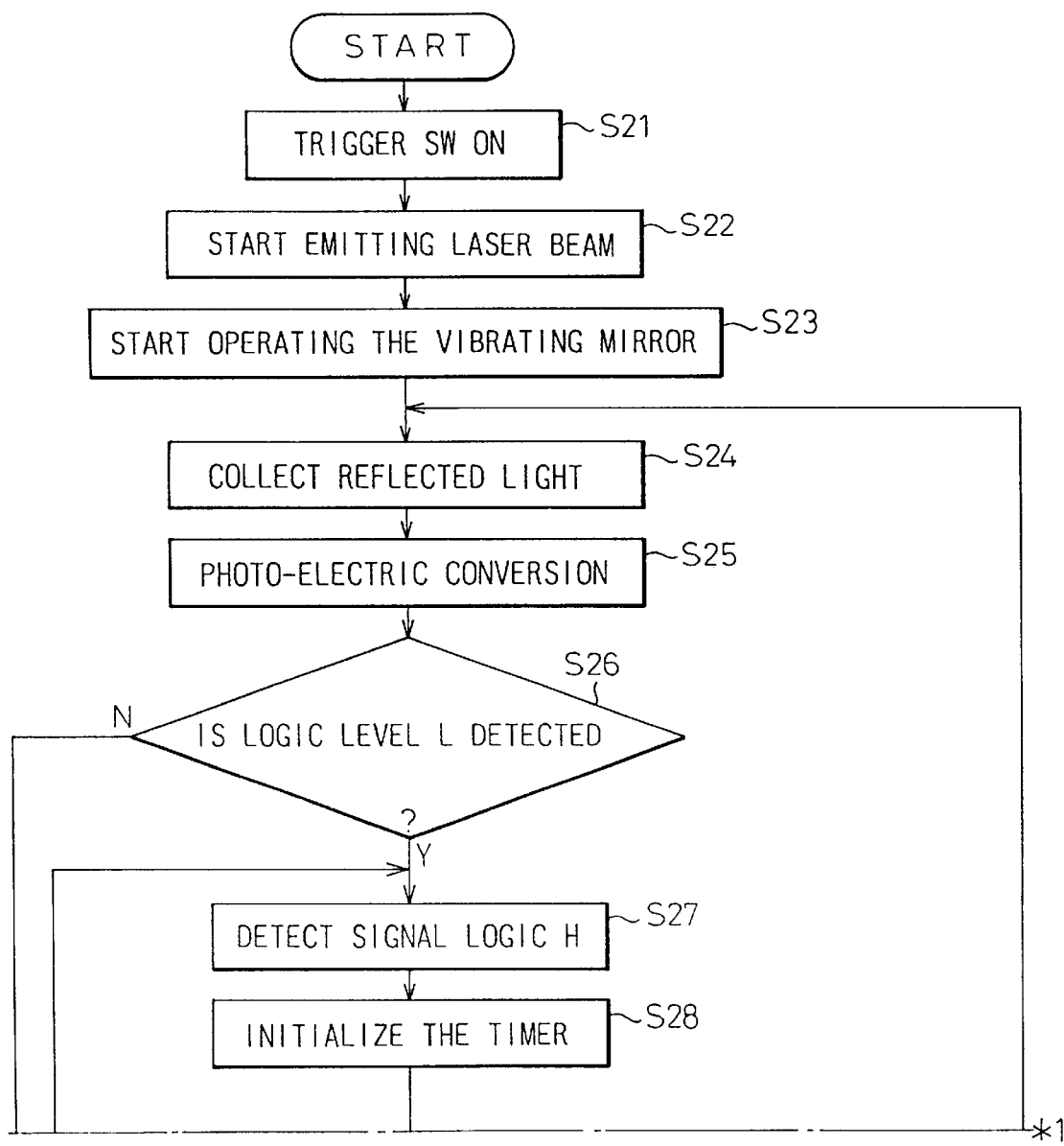
FIGS. 14A and 14B are a flow chart illustrating the basic operation of the bar code reader according to a second embodiment of the present invention.
Figure 14B:
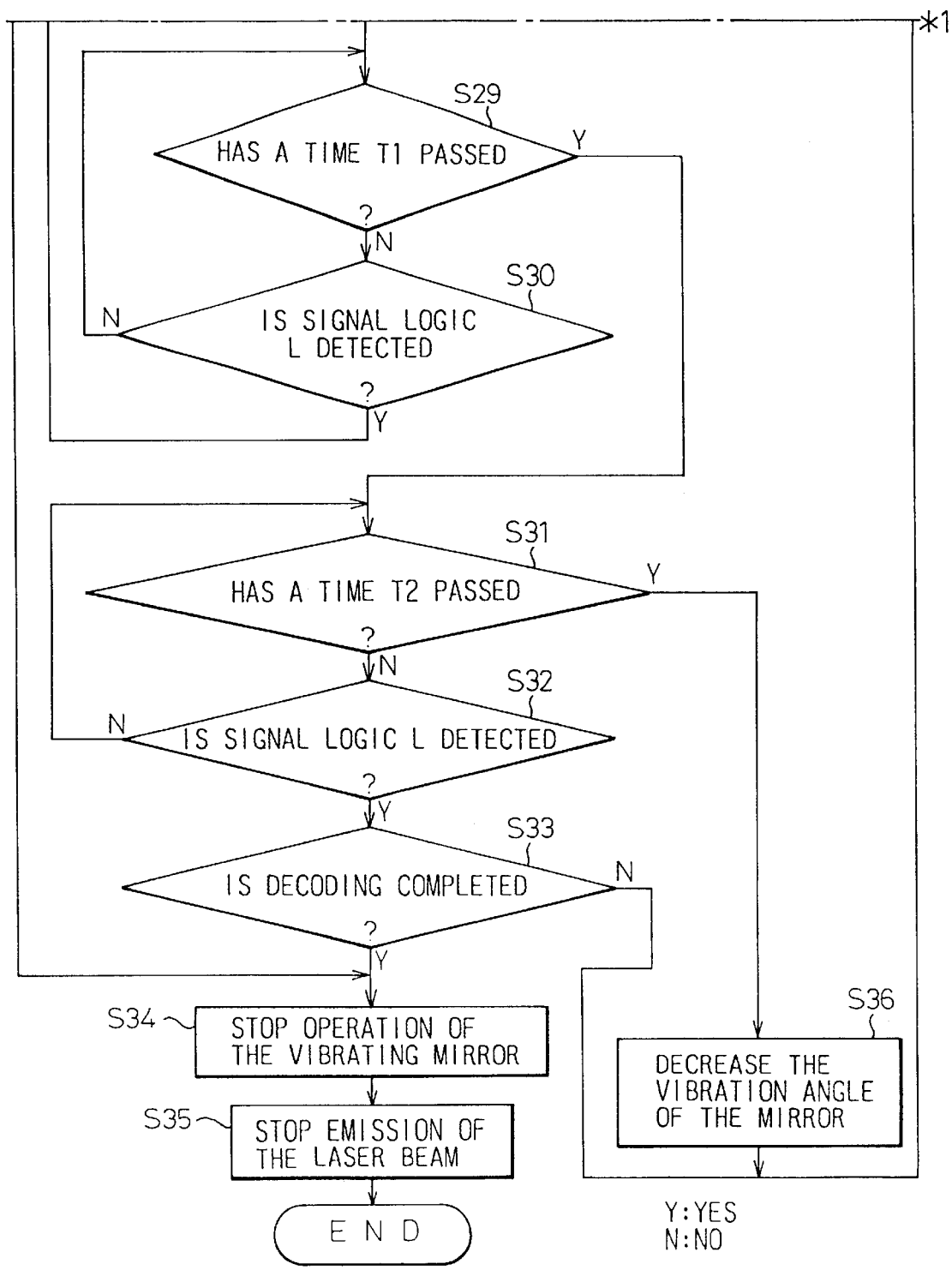

FIGS. 14A and 14B illustrate an upper half portion and a lower half portion of a flow chart of the operation according to a second embodiment of the present invention. First, the operator turns the trigger switch 2 on (step S21) to emit the laser beam (step S22).

Operation of the vibrating mirror is started (step S23) to start the scanning of bar codes, here the initial scanning amplitude is the maximum amplitude. Then, the reflected light is collected (step S24) and the photo-electric conversion is carried out (step S25). The above-mentioned operations are the same as those of the first embodiment.

It is determined whether the logic signal L is detected or not, i.e., whether bars exist or not based upon the voltage waveforms obtained as a result of photo-electric conversion (step S26). When the logic signal L is not detected completely, it is determined that no bar code exists, and the operation of the vibrating mirror and emission of the laser beam are no longer continued (steps S34, S35) as will be described later.

When the logic signal H is detected, i.e., a white portion is detected after the logic signal L is detected (step S27), then, the timer is initialized (step S28) in order to determine the length of the logic signal H.

When the result of the photo-electric conversion indicates that the blank portion T shown in FIG. 13B is shorter than a specified gap, the electric signal is converted into numerical data or similar data through the decoder.

Thereafter, it is determined whether a preset time T1 (scanning time corresponding to an interval between two blocks of a separated type bar code in the bar code reading) corresponding to a bar gap in bar codes of a separated type has passed or not (step S29).

Bar codes of the separated type are bar codes that have a large white gap (which is determined by a standard) in the middle of the bar code.

The bar code of the separated type indicates a set of a plurality of bar codes. In this case, even when there exists a gap between two bar codes, these bar codes must be processed as one bar code.

When the preset time corresponding the bar codes of the separated type has not passed at the step S29, it is determined whether a subsequent logic signal L is detected or not (step S30).

When the logic signal L is detected before the passage of the preset time T1, the operation after the detection of the logic signal H at the step S27 is executed. When the logic signal L is not detected, on the other hand, it is determined whether the preset time T1 (scanning time corresponding to an interval between two blocks of a separated type bar code in the bar code reading) at the step S29 has passed or not.

When it is determined at the step S29 that the preset time T1 has passed, then, it is determined whether a preset time T2 longer than a bar gap of the separated type has passed (a gap exists between bar codes) or not (step S31).

When the logic signal L is not detected after the passage of the time T1, it is determined whether the logic signal L is detected or not (Step S32). Namely, when the logic signal H continues longer than time T1, the bar gap may be that of a speparated bar code, however, when the logic signal H continues longer than time T2, the bar gap may be a gap between two bar codes. Thus, T1<T2.

When the preset time T2 has not passed, it is determined whether the logic signal L is detected or not (step S31). When the logic signal L is detected before the passage of the preset time T2, the bar is that of the bar codes of the separated type. Thereafter, detection of the logic signals H and L may be continued.

When it is determined that the preset time T2 has passed, it is determined whether the decoding is completed or not, i.e., whether the bar code is normally read out or not (step S33). When the decoding is completed, operation of the vibrating mirror is discontinued (step S34) and the laser beam is no longer generated (step S35) to thereby finish the operation.

When the logic signal L is detected after the passage of T2 at the step S32, it means the passage of a time which is longer than an ordinary bar gap. It is, then, determined that the bar gap detected here is that between two different bar codes.

In this case, it is presumed that a plurality of bar codes are included in the scanning region of the laser beam, and the angle of vibration of the mirror is gradually decreased (step S36) to execute the operation for narrowing the scanning region as represented by 1–2, 2–3, 3–4, - - - in FIG. 9. Then, the processes after the step of collecting the reflected light (step S24) are executed. In this embodiment decreasing the scanning amplitude, the angle of vibration may be automatically decreased after the scanning is executed with a predetermined angle for a predetermined number of times or a predetermined time.

When it is determined at the step S33 that the decoding has not been completed, it is so determined that the bar code was not accidentally read out due to printed state of the bar code though the scanning region was just satisfactory, and the reading operation is executed again.

Therefore, the angle of vibration of the mirror is maintained unchanged, and processes after the step of collecting the reflected light (step S24) are executed.

Setting of the times T1 and T2 plays a very important role for reliably executing the above-mentioned processes. The time T1 must be shorter than the bar gap of an ordinary bar code or shorter than a code gap in the case of the bar codes of the separated type in which the code is divided into a plurality of portions.

The time T2, on the other hand, must be longer than the code gap of the bar codes of the split type. When the time T2 is longer than this code gap, it is determined that the bar is that of another closely neighboring bar code. The times T1 and T2 are set by a timer that is not shown but that is incorporated in the device, and will be suitably changed depending upon the conditions where the device is used.

The time T2 may be determined in regard to whether or not a blank period of a logic signal has lasted for a period of time that is slightly longer than the bar code with a margin thereof as a reference.

When it is determined at the step S33 that the decoding has not been completed, it is determined that the scanning region was too narrow. The scanning region then may be widened to execute the reading operation again.

According to the bar code reader of the present invention as described above, the scanning region of the laser beam can be changed. Therefore, the vibration region of scanning beam of the laser scanner is stepwisely increased from a dot to a long segment.

Moreover, when it is detected that a plurality of bar codes are included in the scanning region of the scanning beam, the vibration region of the scanning beam is stepwisely narrowed to a short segment.

As a result, the problem that it is not certain which bar code was read out, with a plurality of bar codes being included in the scanning region of the laser beam, does not occur.

What is claimed is:
1. A bar code reader, comprising:
   a transmitter including a light source,
   a vibrating mirror which scans bar codes using a light beam from said transmitter and collects light reflected by the bar codes,
   a receiver made up of a light sensor which converts the reflected light that is collected into electrical signals, a decoder which converts the electrical signals from said receiver into data characters, determining means for determining a time period in which there is no change in the amount of the reflected light, and a vibration angle adjuster means for scanning the bar codes while changing the angle of vibration of said vibrating mirror, wherein said vibration angle adjuster means stepwisely decreases the angle of vibration of the vibrating mirror in order to stepwisely decrease the scanning region for the bar codes when said determining means determines said time period to be longer than a first predetermined value.

2. A method of reading bar codes comprising:

(1) emitting a light beam from a light beam-emitting element;

(2) operating a vibrating mirror which scans the bar codes using the light beam and collects the light reflected by the bar codes, the vibrating mirror being allowed to change its angle of vibration;

(3) converting the light that is reflected by the bar codes and is collected into electrical signals;

(4) decoding the electrical signals into data characters; and (5) detecting a time period in which there is no change in the amount of the reflected light when the scanning beam is scanning the bar codes;

wherein when said time period is longer than a first predetermined value, step (2) includes decreasing the angle of vibration of the vibrating mirror so as to stepwisely decrease the scanning region for the bar codes, wherein step (4) decodes said electrical signals to determine whether the bar code is read out or not, and, when the bar code is not read out, said step (2) changes the angle of vibration of the vibrating mirror so as to stepwisely increase the scanning region for the bar codes.

3. The method of claim 2, wherein:

step (4) includes decoding the electrical signals as a separated type bar code when said time period is larger than a second predetermined value and shorter than said first predetermined value.

4. The method of claim 3, wherein said steps of determining a time period in which there is no change in reflected light includes detecting a length of time in which said electrical signals produced by step (3) are a high logic level.

5. The method of claim 4, further comprising:

before step (5), (6) ending operation of the vibrating mirror of step (2) if a low logic signal is not detected completely.

6. The bar code reader of claim 1, wherein said decoder converts the electrical signals from said receiver as a separated type bar code when said determining means determines said time period to be longer than a second predetermined value and shorter than said first predetermined value.

7. The bar code reader of claim 6, further including means for determining that no bar code exists when a low logic level is not initially detected completely.

\* \* \* \* \*